July 17, 1923.

L. MORINSKY 1,461,760

APPARATUS FOR MOISTUREPROOFING PACKAGES

Filed Sept. 25, 1919

Witness: Harry S. Gaither

Inventor: Louis Morinsky
Peirce, Fisher & Clapp
Att'ys

July 17, 1923.

L. MORINSKY

1,461,760

APPARATUS FOR MOISTUREPROOFING PACKAGES

Filed Sept. 25, 1919

L. MORINSKY

1,461,760

APPARATUS FOR MOISTUREPROOFING PACKAGES

Filed Sept. 25, 1919     7 Sheets-Sheet 7

Patented July 17, 1923.

1,461,760

UNITED STATES PATENT OFFICE.

LOUIS MORINSKY, OF NEW YORK, N. Y., ASSIGNOR, BY MESNE ASSIGNMENTS, TO THE CRACKER JACK CO., A CORPORATION OF ILLINOIS.

APPARATUS FOR MOISTUREPROOFING PACKAGES.

Application filed September 25, 1919. Serial No. 326,366.

*To all whom it may concern:*

Be it known that I, LOUIS MORINSKY, a citizen of Russia, and a resident of New York, county of New York, and State of New York, have invented certain new and useful Improvements in Apparatus for Moistureproofing Packages, of which the following is a specification.

The invention relates to apparatus for rendering packages in which food products are marketed air and moisture tight and seeks to provide improved means whereby a rectangular package or paper carton, which has been filled with confectionary, cereal or other food product, and sealed, can be provided with a continuous unbroken coat or film of paraffine wax or the like, to prevent the passage of moisture through the package walls.

The invention consists in the features of improvement hereinafter set forth, illustrated in the preferred form in the accompanying drawings and more particularly pointed out in the appended claims.

In the drawings, Figure 1ª is a detail view.

The machine frame comprises two horizontal lower angle bars 10 and a pair of upper angle bars 11. The lower angle bars are mounted on uprights 12 and are connected by bolts 13 having spacing sleeves 14 mounted thereon. Two cast metal brackets or uprights 15 (see Fig. 7) extend between the right hand ends of the horizontal frame bars 10 and 11 and are bolted thereto. The frame bars 11 are connected at intervals by transverse bolts 16 having spacing sleeves 17 mounted thereon. At their left hand ends, the horizontal frame bars 10 and 11 are connected by transverse angle bars 18 and these bars are connected at their ends by vertical bolts 19 having spacing sleeves 20 thereon. A tank 21 for containing melted paraffine is fixed in positon upon the horizontal frame bars 10 and receives the melted paraffine or other like moisture proofing material. Paraffine wax is preferably employed and the tank is provided with a steam coil 22 for maintaining the paraffine liquid and at the desired temperature.

The packages are passed through the bath of melted paraffine by an endless carrier comprising an endless chain 23 having a number of pairs of grippers thereon for engaging the separate packages. At the right hand end of the machine, the carrier chain passes over a driving sprocket 24 fixed on a shaft 25, the latter being journaled in bearings mounted on the upper frame bars 11. From the wheel 24 the carrier chain passses forwardly and downwardly over a pair of guiding sprockets 26 which are located at the upper central portion of the tank 21. Thence, the carrier chain passes upwardly and forwardly over a guiding sprocket 27 at the upper forward part of the machine frame. From the latter the chain passes upwardly and forwardly at a slightly steeper angle over a guide sprocket 28 which is carried at the upper end of a vertically disposed frame 29. From this guide sprocket the carrier chain passes downwardly and rearwardly at an incline and over the drive sprocket 24. The sprocket wheel 28 is carried by a shaft 30 which is preferably mounted in adjustable bearings 31, so that the carrier chain can be placed under the desired tension. The guiding sprocket 27 at the upper left hand portion of the main frame is mounted on a shaft 32 which is journaled in bearings fixed to the upper horizontal frame bars 11. The guiding sprockets 26, which are arranged above the central portion of the dipping tank 21, are mounted on two horizontal shafts 33 which are journaled at their ends in suitable bearings fixed to a pair of horizontal supports 34, the latter being secured to two cast metal brackets 35 which are fixed to and depend from the upper frame bars 11.

Figure 8:
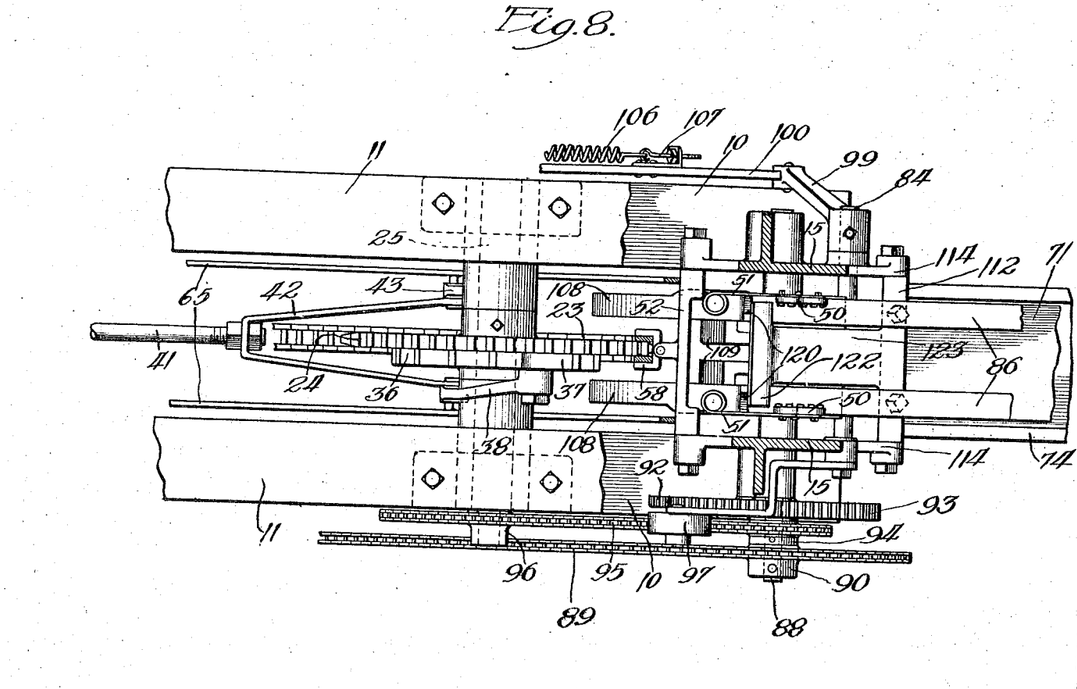

A ratchet wheel 36 is fixed to one side of the driving sprocket 24 and is arranged to be engaged by a pawl 37 carried upon the upper end of the oscillating arm 38. The latter is loosely mounted intermediate its ends upon the shaft 25 and its lower end is connected by a pitman rod to the crank portion 39 of a transverse horizontal shaft 40. Preferably, the pitman rod comprises a rod section 41 which engages the crank 39 and a yoke section 42 (see Figs. 2 and 8) which is adjustably connected to the rod section 41 and one arm of which is connected to the lower end of the oscillating arm 38. The other arm of the yoke is connected to an oscillating arm 43 which is loosely mounted on the shaft 25, this arm and the pawl-carrying arm 38 being arranged on opposite sides of the gear 24.

The shaft 40 is journaled in suitable bearings in the brackets 35 and is provided at one end with a gear 44 which meshes with a pinion 45 on a drive shaft 46. The latter is journaled in the upper portions of the brackets 35 and is adapted to be driven from any suitable source of power. In the form shown, it is provided with tight and loose pulleys 47 and 48 over which passes a drive belt 49. By the mechanism described, the endless carrier is advanced step by step.

The present apparatus is more particularly designed for dipping rectangular packages which have been first filled and sealed. Preferably, the confectionery, cereal, popcorn or the like is placed within pasteboard cartons and the latter inclosed in paper wrappers which are folded and sealed about the carton. The cartons and wrappers may or may not be formed of waterproof material. In either event, it is highly desirable to provide a continuous, unbroken coat or film over the entire outer surface of the package to satisfactorily render the same air and moisture tight.

The endless carrier chain is provided with package holders or pairs of grippers which are arranged to engage the individual packages and convey them through the melted paraffine. In the preferred form shown, the grippers comprise metal plates 50 carried upon the outer ends of spring arms 51 which are mounted at their inner ends upon gripper supports or holders 52, the latter in turn being connected to the sprocket chain 23. In order that the melted paraffine may have access to the ends of the packages which are engaged by the gripper plates 50, the latter are provided with numerous perforations 53 the edges of which are turned inwardly and project beyond the inner faces of the plates to form perforated bosses 54. The edges of the perforated bosses are beveled so that they will securely grip the packages but will only have line contact therewith and will not prevent the paraffine from thoroughly coating the ends of the packages.

Figures 11, 12, 13:
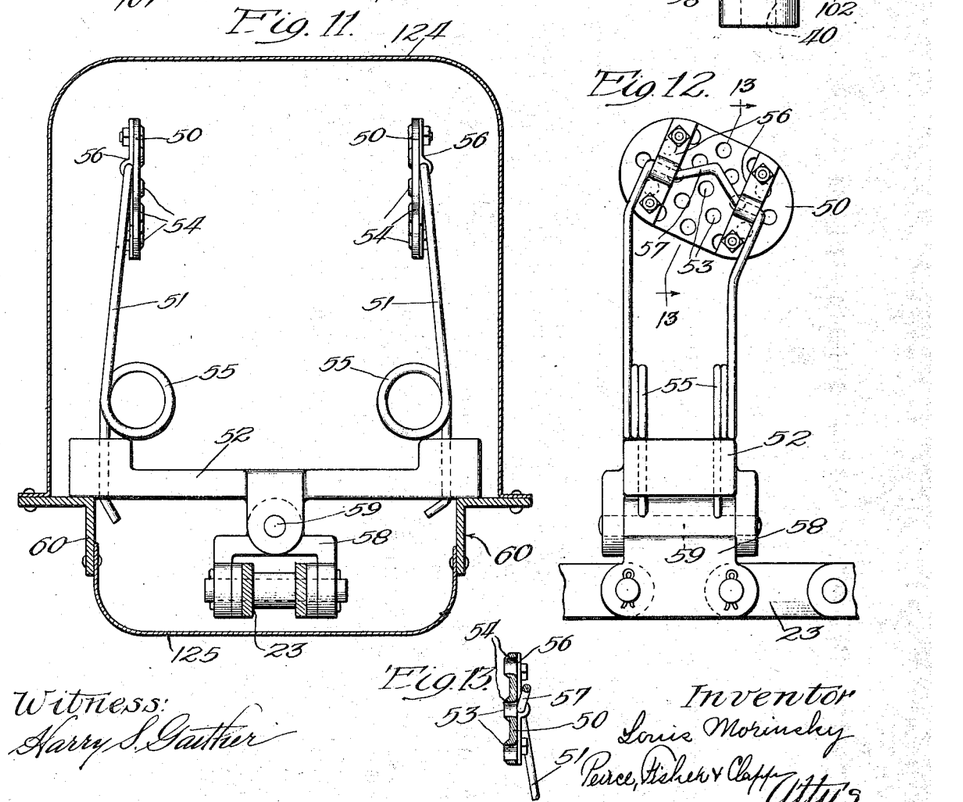
Figure 11 is a section on the line 11—11 of Fig. 1.
Figure 12 is an end view of one of the package grippers.
Figure 13 is a detail section on the line 13—13 of Fig. 12.

The spring arms 51 of the grippers are preferably U-shaped as shown and the inner ends of the arms are inserted in holes formed in the ends of the gripper holders 52. Coiled portions 55 of the arms engage the outer ends of the holders and the extreme inner ends of the arms are bent over, as most clearly shown in Fig. 11, to prevent the disengagement of the arms from the holders. The spring arms of each pair of grippers are inclined inwardly towards each other to a slight extent, as shown in Fig. 11, and the end portions of the arms are offset forwardly or in the direction of movement of the chain so that the gripper plates are held in an inclined position relatively to the chain (see Fig. 12). The transverse outer end portions of each U-shaped spring arm pivotally engages a pair of clips 56 that are secured to the outer face of the gripper plate carried thereby and the portion 57 of the spring arm between the clips is offset in longitudinal direction, as shown in Fig. 12, and is bent laterally in outward direction to a slight extent, as most clearly shown in Fig. 13. Normally, when the plates 50 of a pair of grippers are brought into engagement with the ends of a package, the main plates are vertically disposed and the main portions of the arms and the parts 57 thereof are slightly inclined to the vertical in opposite directions, as shown in Fig. 13. This arrangement permits the slight oscillation of each gripper plate about a substantially horizontal axis on the outer end of its supporting arm. Furthermore, since the inner ends of each spring arm extend loosely through openings in the end of one of the holders 52, each arm and the gripper plate thereon can oscillate to a slight extent about a vertical axis. By reason of this construction, the gripper plates will bear squarely upon the ends of the packages in spite of any slight irregularities in the exact parallelism of the opposite ends thereof, and since the plates are pressed inwardly by these spring arms, they will securely grip the packages without crushing them. Where the packages, as is preferred, are enclosed in folded and sealed paper wrappers, the gripper plates will snugly and firmly engage the end folds of the wrappers and prevent them from loosening or becoming unsealed as the packages are passed through the hot bath of melted paraffine.

Figure 4:
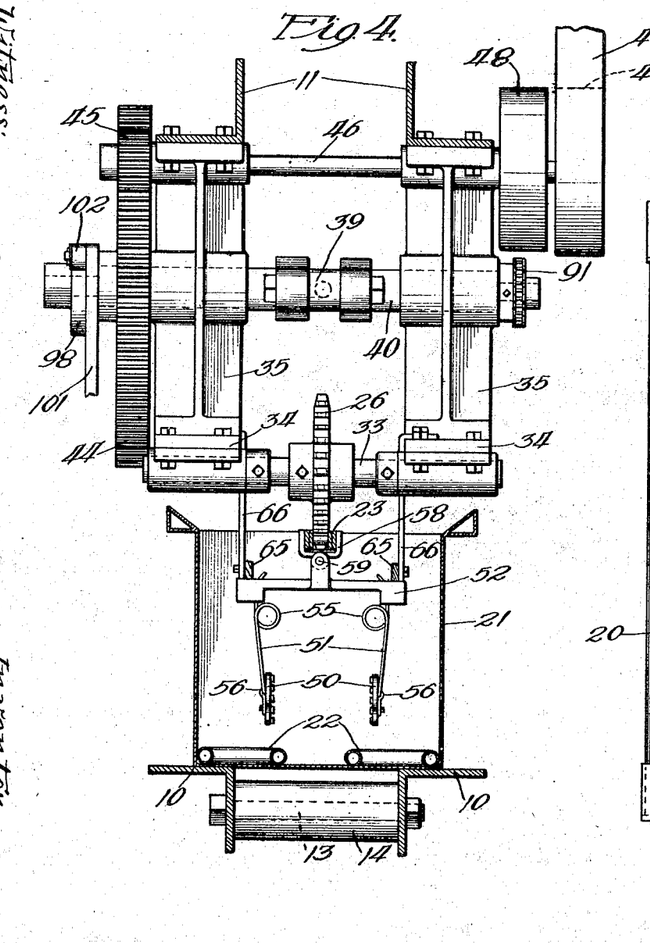
Figures 4 and 5 are cross sections on lines 4—4 and 5—5, respectively, of Figs. 1 and 3.

The endless carrier chain 23 is provided at intervals with U-shaped clips 58 which are fixed thereto and project outwardly therefrom. The gripper holders 52 are centrally connected to the clips by pivot bolts 59 arranged parallel to the chain so that the grippers can be tilted or swung to an inclined position. Throughout the greater portion of the path of movement of the grippers, however, the grippers are held against tilting movement by suitable guides. Thus, along the upper reach of the carrier chain, the ends of the gripper holders engage two inclined, guiding angle bars 60 which at their extreme upper ends are connected to the upright frame 29 and at their opposite ends are fixed to supports 61 which extend upwardly from the frame bars 11. Intermediate their ends, the guides 60 are connected to brace bars 62 which in turn are fixed to inclined brace bars 63 extending upwardly from the left hand end of the main to the upright frame 29. To properly hold the grippers in position as the chain passes over the sprocket 28, the shaft 30 is provided with two drums 64 on opposite sides of the sprocket 28 and these drums engage the ends of the gripper holders 52 and properly direct the same onto the upper ends of the inclined guides 60. As the grippers pass over the lower ends of the guides 60, they are engaged by a pair of guide straps or bars 65 which are curved to correspond with the path of movement of the carrier chain and extend from the lower ends of the guide bars 60, to a point substantially midway between the two guiding sprockets 26. The upper ends of these guide bars 65 are fixed to the lower ends of the guide bars 60 and the lower portions thereof are connected by straps 66 to the horizontal members 34 (see Fig. 4).

Figure 5:
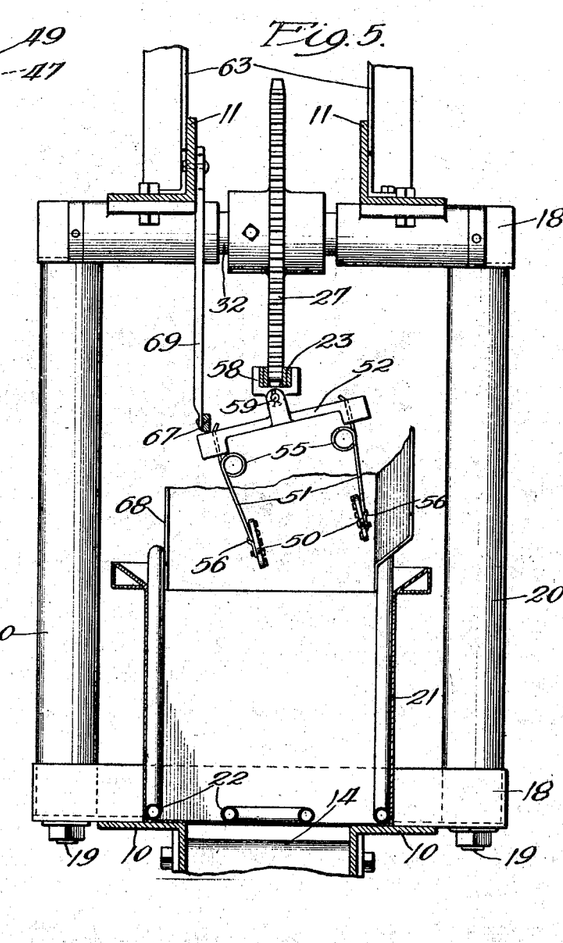
Figure 6:
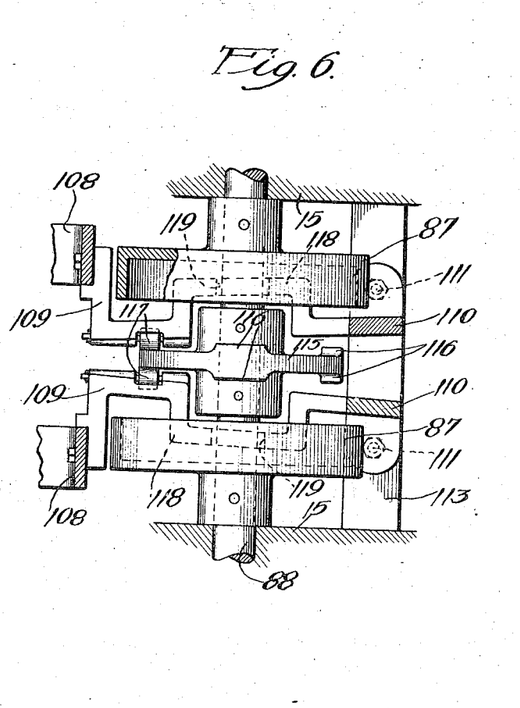
Figure 6 is a detail section on the line 6—6 of Fig. 2.

One of the guide bars 65 terminates at its lower portion substantially midway between the sprockets 26, but the other one is provided with an extension guide 67 that engages the grippers on the upwardly inclined portion of the chain which carries the packages upwardly out of the dipping tank and over an inclined drain pan 68. The latter extends between the left hand end of the dipping tank 21 and the upright frame 29. The guide bar 67 is spaced further from the path of movement of the carrier chain than are guide bars 60 and 65 so that, as most plainly shown in Fig. 5, the grippers are tilted or inclined when in engagement therewith. This guide bar is connected to the upper frame bar 11 by a support 69 and to the brace bar 63 by two supports 70. Preferably, the supports 69 and 70 are adjustable so that the inclination of the grippers can be varied.

Figure 3:
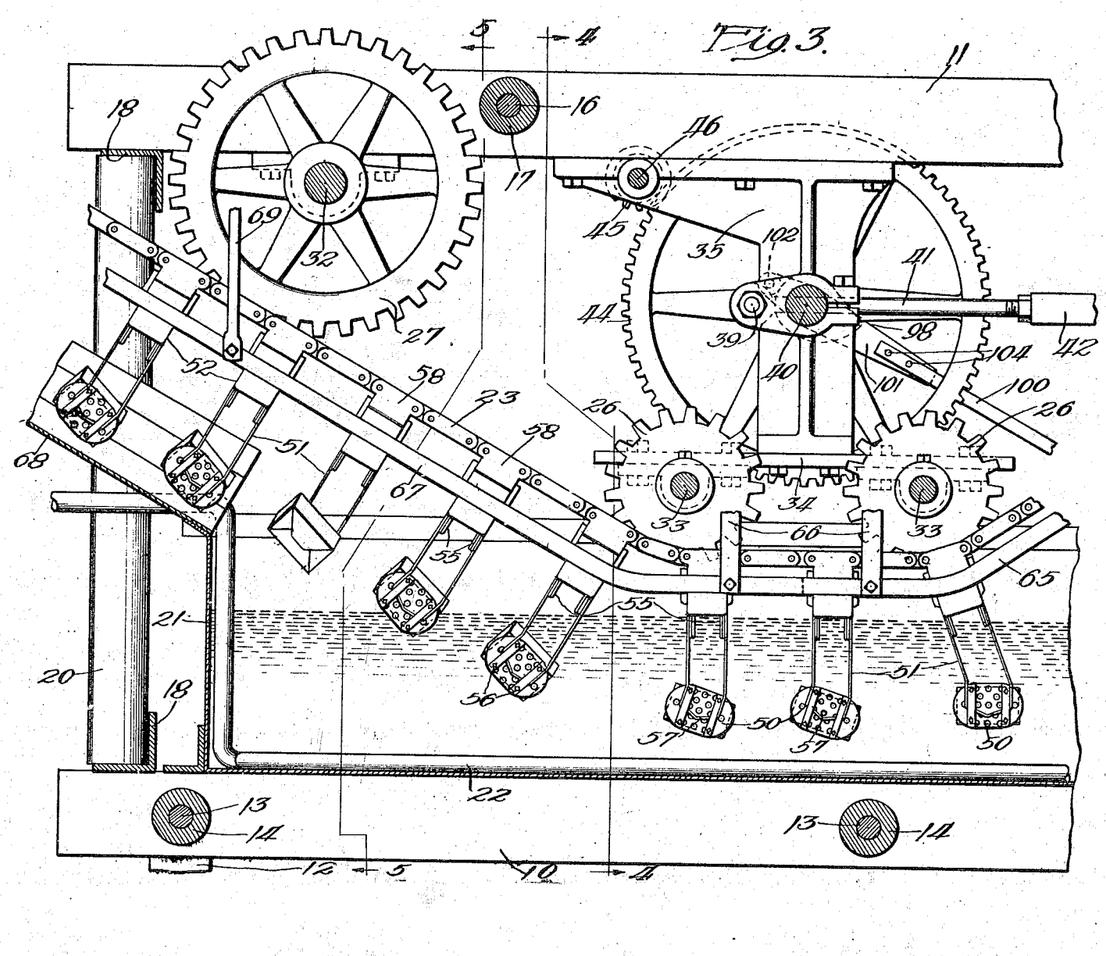
Figure 3 is a sectional elevation of the central portion of the machine and more particularly illustrating the package dipping means.

The packages are removed from and inserted in the grippers at the right hand end of the machine. From this point the grippers on the lower reach of the carrier chain pass the packages downwardly through the bath of melted paraffine in the tank 21 and thence upwardly at an incline over the inclined drip pan 68. As the packages pass over the latter, any excess paraffine falls therefrom into the pan and thence back into the dipping tank. By reason of the inclined path of movement of the grippers as they leave the dipping tank and because of the tilting thereof by the guide bar 67, the rectangular packages are withdrawn from the bath of melted wax and passed over the drip pan with one corner of each package lowermost, as indicated in Fig. 3. It should be noted that the packages are held in this position for a considerable length of time as they are passed through a substantially straight upwardly inclined path so that ample time is afforded for the excess wax to accumulate and drain from the lowermost corner of each rectangular package. This arrangement greatly facilitates the proper draining of the excess wax from the packages and renders the coating thereof smooth and uniform. As the packages are carried by the grippers upwardly over the guide drums 64 and sprocket 28 and thence downwardly over the guide bars 60, the paraffine is chilled and set to form a continuous unbroken film over all portions of the package. If desired, a blower may be provided for directing a blast of air along the upper reach of the belt to facilitate the chilling of the paraffine. The construction of the gripper plates 50 is such that it facilitates the chilling of the paraffine at the ends of the packages and at the same time, since they are preferably formed of heavy sheet brass, they themselves will retain the heat imparted thereto by the paraffine bath and the wax will not chill and set upon the plates themselves.

Figure 2:
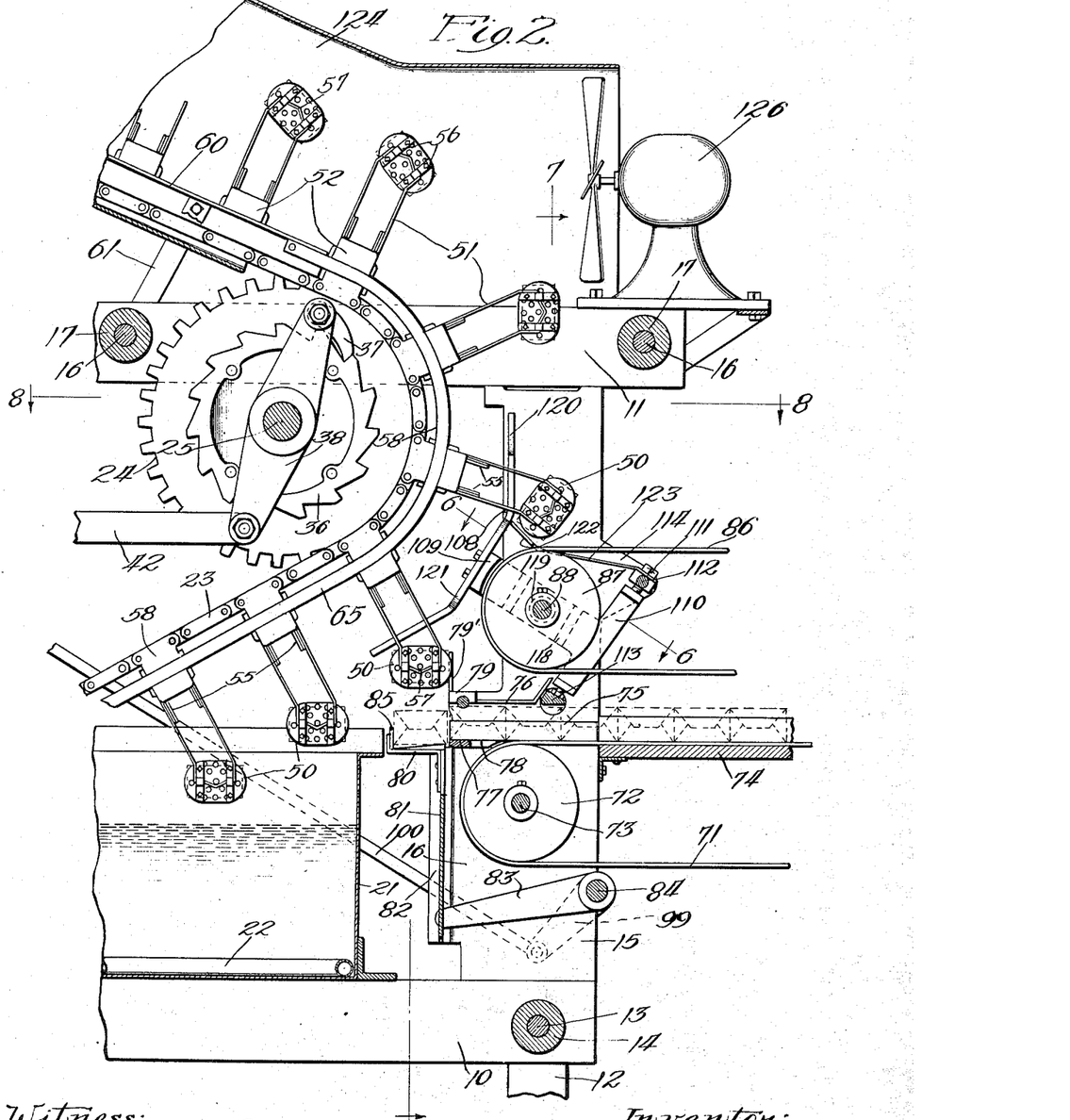
Figure 2 is a sectional elevation of the right hand end of the machine illustrating the package feeding and delivery mechanism.

The filled, wrapped and sealed packages are delivered to the dipping machine by a feeding carrier or belt 71 which at its forward end passes over a drive pulley 72 and at its outer or rear end over a suitable guide pulley (not shown). The pulley 72 is fixed to a shaft 73 which is journaled in the lower portions of the uprights 15 at the right hand end of the machine. Preferably, as shown, the upper reach of the belt 71 which conveys the packages extends through a trough 74 and is supported on the bottom of the trough. The latter is fixed to the outer edge portions of the uprights 15 and terminates in line therewith. From this point, the feed belt moves the package through a guide chute comprising a pair of vertical plates or bars 75, an upper horizontal member 76 and a lower horizontal transverse member or bar 77. The latter extends between the brackets 15 and is provided with a series of fingers 78 which extend inwardly and are provided with pointed or beveled outer ends over which the packages are pushed by the feed belt. The vertical guides 75 are fixed to the transverse bar 77, and extend inwardly and are arranged to engage the ends of the packages and properly aline the same as they are pushed inwardly by the belt. The upper plate 76 of the feed chute is connected to a transverse bar 79 extending between the brackets and extends inwardly therefrom, being provided as shown in Fig. 2, with an upturned inner end.

The packages are pushed through the feed chute onto a vertically reciprocating feeder or plunger 80 which is mounted upon the upper end of a slide 81. The latter is mounted in guides 82 on the brackets 15 and is provided at its lower end with two openings which are engaged by the forward ends of a pair of crank arms 83. The latter are fixed to a transverse rock shaft 84 which is journaled in the bracket 15 and is operated at proper intervals to lift the packages one at a time into such position that they may be engaged by the grippers upon the endless carrier. The feed belt 71 is intermittently operated and the movement of the packages effected thereby is arrested by an upturned stop flange 85 on the forward end of the lifting plunger 80. The plunger is of such size that when in the normal position shown in Fig. 2, the distance between the stop flange 85 thereon and the delivery end of the feed chute is substantially equal to or is slightly greater than the width of one of the packages. Preferably, as shown, the upper face of the plunger is forwardly and downwardly inclined to more securely hold the package thereon as the plunger is shifted. Also, in order to hold the package in position on the plunger, two guide bars 79' (see Figs. 2 and 7) extend upwardly from the cross bar 79 and are arranged to engage the rear side of the package as it is lifted.

A delivery carrier for the finished packages is arranged above the feed belt 71 and is preferably divided, comprising two belts 86 which are spaced apart and run over two spaced drive pulleys 87 (see Figs. 2, 6, 7 and 8) on a transverse shaft 88 that is journaled in the uprights 15.

Figure 1:
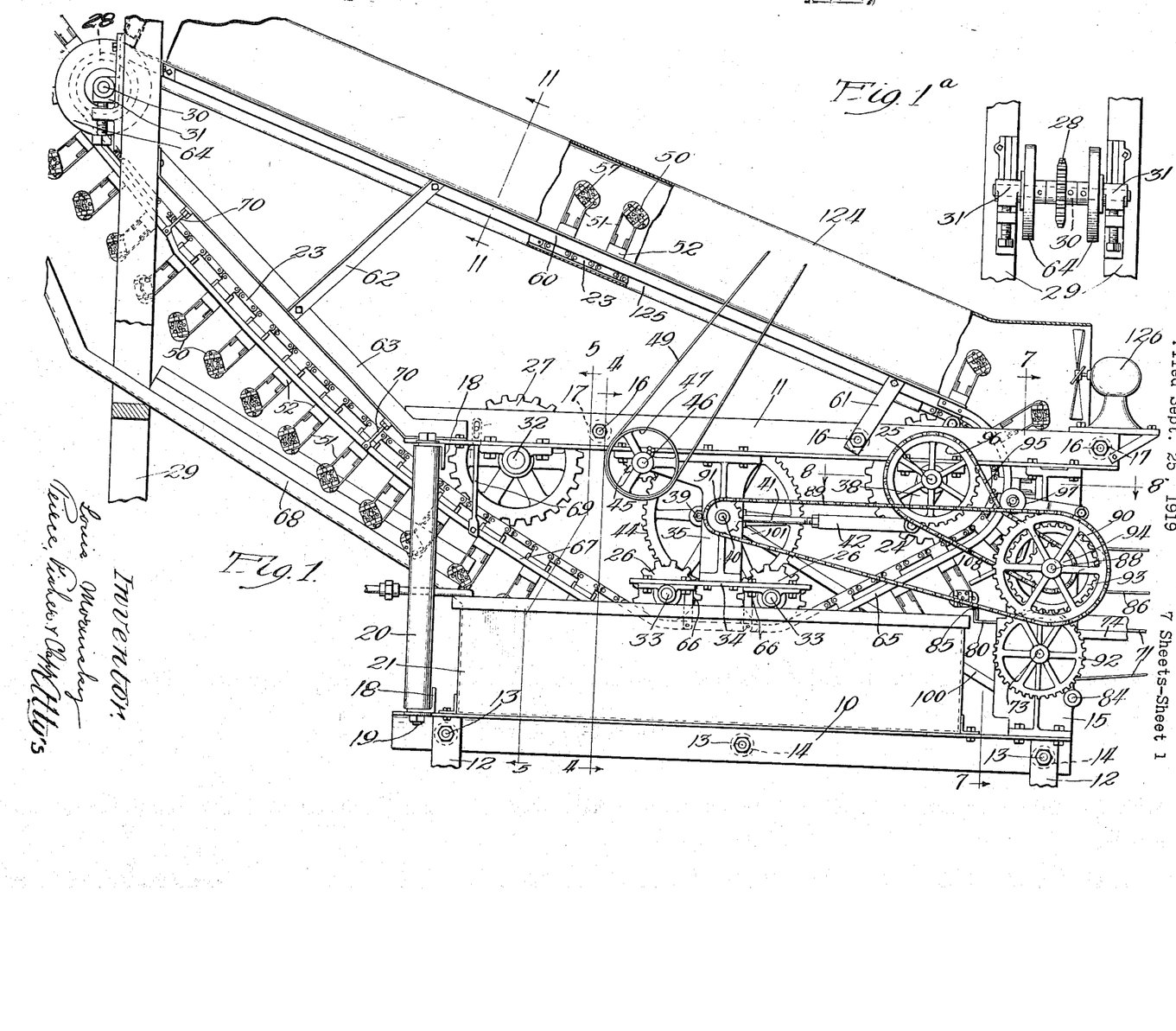
Figure 1 is a view in elevation of the improved machine.

The shaft 88 which operates the delivery carrier belts is continuously driven by a chain 89 that passes over sprocket wheels 90 and 91 (see Figs. 1 and 8) mounted, respectively, on the shaft 88 and on the main shaft 40. The shaft 73 which operates the feed belt 71 is intermittently actuated by suitable mechanism comprising two intermeshing gears 92 and 93, one fixed to the shaft 73 and the other loosely mounted on the shaft 88. A sprocket wheel 94 is fixed to the hub of the gear 93 and a chain 95 connects this wheel with a sprocket wheel 96 on the intermittently operated shaft 25 that actuates the carrier chain 23. The intermittent movement of the feed belt 71 occurs when the lifting plunger 80 is in lowermost position and the movement of the belt is greater than the width of one of the packages, so that its operation moves the foremost package against the stop flange 85 of the lifting plunger and closes up any gaps between the packages on the feed belt and in the feed chute by moving them into engagement with one another.

Figure 9:
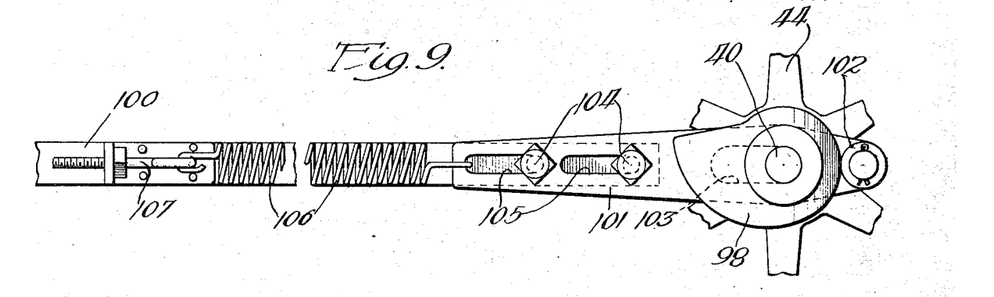
Figure 9 is an elevation and Figure 10 is a plan view of one of the connecting rods.
Figure 10:
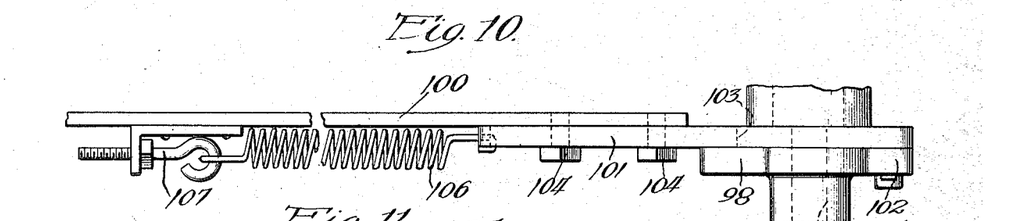

In the form shown, the sprocket wheel 91, is mounted on one end of the main shaft 40. The opposite end of this shaft is provided with a cam 98 for operating the feed plunger 80 through the medium of a link connected to a crank arm 99 that is fixed to the shaft 84, (see Figs. 2, 4 and 8). The connecting link is preferably formed as shown in detail in Figs. 9 and 10 and comprises two yieldingly connected sections 100 and 101. The section 100 is connected to the crank arm 99 and the other section 101 is provided with a roller 102 arranged to be engaged by the cam 98 and also has a guide slot 103 through which the main shaft 40 extends. Bolts 104 fixed to the upper forward end of the link section 100 extend through slots 105 in the section 101 to provide a lost motion connection between the link sections. A spring 106 connects the link sections and normally takes up all the lost motion or play between the same, one end of the spring being preferably provided with an adjusting screw 107.

The mechanism just described intermittently operates the rock shaft 84 and lifting plunger 80 to raise the packages one at a time into position to be engaged by the package grippers of the endless carrier. Normally, there is no relative movement between the link sections 100 and 101, but it is possible that there might not be sufficient packages on the feed belt to push the forward package completely on to the lifting plunger or one of the packages might be jammed before it is completely pushed through the feed chute. Under such circumstances, the connection between the link sections 100 and 101 would yield and the package would not be crushed by the plunger.

The endless carrier and the grippers thereon are intermittently operated, as described, step by step. At the end of each movement, one pair of grippers is brought to discharging position immediately above the end of the delivery belts 86 and the pair of grippers immediately in advance is brought to receiving position or in line with the feeding plunger 80, as shown in Fig. 2. The pairs of grippers in discharging and receiving positions are opened to discharge a finished package and receive a fresh package by a pair of spreader bars 108. The latter are centrally mounted on the forward ends of a pair of inclined supporting arms 109 and the end portions of the spreader bars are bent as most clearly shown in Fig. 2, to extend between and substantially at right angles to the spring arms 51 of the pairs of grippers in discharging and receiving positions. The spreader supporting arms are provided with T-shaped rear ends 110 which are connected by pivot screws 111 to two transverse bars 112 and 113. The bar 113 extends between the central portions of the uprights 15 and the bar 112 extends between rearwardly projecting lugs 114 on the uprights. The spreader supports 109 are arranged to be separated by a cam wheel 115 (see Figs. 6 and 7) centrally mounted on the shaft 88 and provided with pairs of lugs 116 which are arranged to engage rollers 117 mounted on the forward ends of the supporting arms 109. The latter are provided with U-shaped central portions 118 which extend about the hub of the cam wheel 115 and are also provided with openings 119 through which the shaft 88 extends. The opposite ends of the spreader supports extend between the peripheral portions of the pulleys 87 over which the delivery belts 86 pass and it is to permit this arrangement of the spreaders that two spaced delivery belts, instead of a single belt, are employed.

Figure 7:
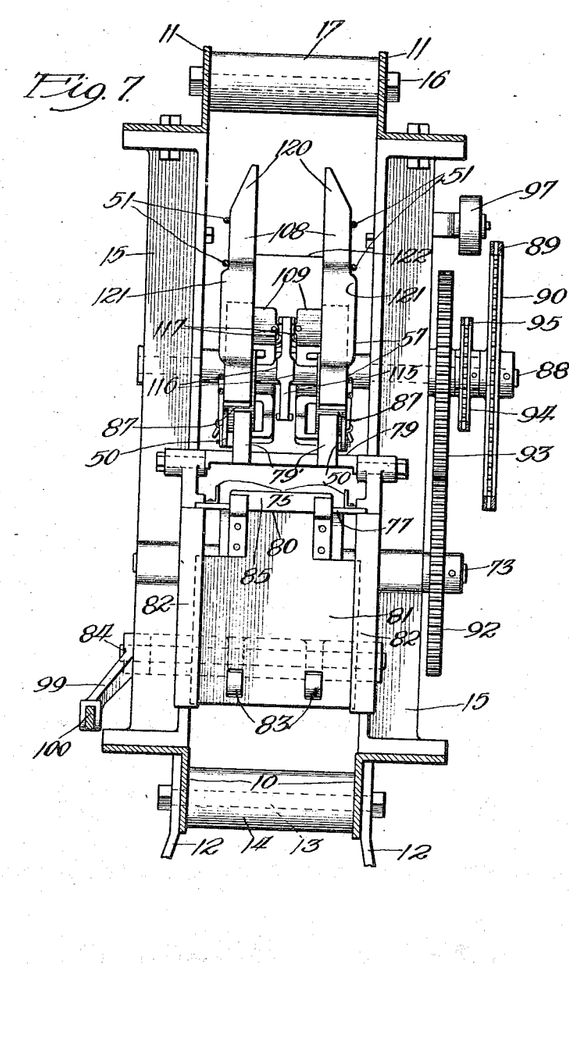
Figures 7 and 8 are vertical and horizontal sections on the lines 7—7 and 8—8, respectively of Figs. 1 and 2.

The drive shaft 25 for the endless chain or dipping conveyor is intermittently operated, as described, through ratchet mechanism driven by the crank arm 39 on the main shaft 40. This shaft and the drive shaft 73 for the feeding conveyor or belt 71 are thus actuated during one-half of each revolution of the main shaft 40 and are idle or at rest during the other half of each revolution. The operating cam 98 for the lifting plunger 80 and the wheel 115 having the cam lugs 116 thereon for operating the gripper spreaders 108 are so arranged that the plunger 80 is lifted and the pairs of grippers in receiving and discharging position are opened and closed to discharge a finished package and engage the package lifted by the plunger while the dipping conveyor and feed conveyor are at rest. That is to say, when the dipping conveyor is brought to rest with one pair of grippers in receiving position and the next succeeding pair in discharging position, a pair of lugs 116 on the cam wheel 115 passes between the spreader arms 109 and separates the spreaders 108, to thereby open the pairs of grippers in receiving and discharging positions, so that the package engaged by the grippers in discharging position drops therefrom to the delivery belts 86 at the same time that the grippers in receiving position are held open. The plunger 80 is shifted to lift one of the packages and, as the cam lugs 116 pass the rollers 117 on the supporting arms, the spring arms 51 of the grippers in receiving position will press the plates 50 thereof inwardly into engagement with the ends of the lifted package. The plunger operating mechanism 98 is so shaped that the plunger then quickly drops so that it will not interfere with the next forward movement of the dipping conveyor or carrier and will be in position to receive the next package from the feeding conveyor. It should be noted that when a pair of grippers is in receiving position, the forwardly offset end portions of the arms hold the gripper plates 50 thereof with their longitudinal axes substantially horizontal so that the plates squarely engage the ends of the packages. It should also be noted that the spreader bars are always engaged by the spring arms of one or more pairs of grippers and these arms tend to force the spreader bars inwardly and hold the rollers 117 on the arms 109 in engagement with the faces of the cam wheel 115. To insure proper engagement with the gripper spring arms 51 with the spreader bars, the latter are preferably provided with beveled upper end portions 120, as shown in Fig. 7. In the form shown, the outer edges of the spreader bars are also provided with raised central portions 121 which engage the spring arms 51 of the grippers as they pass over the same, so that the gripper plates 50 properly clear the pulleys 87 which drive the delivery belts 86.

Preferably, an inclined plate 122 is provided above the ends of the delivery belts 86 to properly deflect the packages onto the belts as they fall from the grippers. This plate is formed upon the forward end of a bar 123 which is fixed to the cross bar 112 and extends upwardly and forwardly therefrom between the delivery belts (see Figs. 2 and 8).

By the improved mechanism described, the filled, wrapped and sealed packages are automatically fed one at a time to the grippers on the endless chain, are carried thereby down through the bath of melted paraffine, are so tilted as they are withdrawn from the bath that the excess paraffine is drained from one lowermost corner of each package, are exposed to the air and also, preferably, to an air blast so that the paraffine coat or film is set, and are then automatically discharged and carried away from the machine.

In the form shown, the upper reach of the carrier chain is inclosed by metal plates 124 and 125 secured to the guide bars 60, as most clearly shown in Fig. 11, the plates forming a flue through which the carrier chain and dipped packages pass. A suitable fan or blower 126, which is conveniently in the form of an electric fan, is mounted on the right hand upper end portion of the frame and is arranged to deliver a blast of air through the flue. This arrangement assists in chilling and setting the paraffine upon the packages.

Obviously, numerous changes may be made in the details set forth without departure from the essentials of the invention as defined in the claims.

I claim as my invention:

1. In an apparatus for moisture-proofing elongated, rectangular, filled packages, the combination with a tank for moisture-proofing material, of devices for passing the packages through the material comprising an endless, flexible carrier having laterally projecting grippers arranged to engage the opposite ends of the packages, means for opening and closing said grippers to receive and discharge the packages, and means for guiding said carrier and said grippers arranged to effect the draining of the elongated, rectangular packages with the lengthwise edges thereof slightly inclined to the horizontal and with one such edge lower than the others.

2. In an apparatus for moisture proofing rectangular filled packages, the combination with a tank for moisture proofing material, of means for passing the packages therethrough comprising a carrier having relatively shiftable package holders thereon, and means for shifting said package holders relatively to said carrier when the packages are withdrawn from the material to effect the draining thereof with one corner of each rectangular package lowermost.

3. In an apparatus for moisture proofing rectangular filled packages, the combination with a tank for moisture proofing material, of means for passing the packages through the material comprising an endless flexible carrier having package holders pivotally mounted thereon, means for guiding a portion of the carrier upwardly at an angle as the latter passes away from the material, and means for tilting the holders on their pivots at the inclined portion of the carrier.

4. An apparatus for moisture proofing rectangular filled packages, comprising a tank for moisture proofing material, a drip pan at one side of said tank, an endless flexible carrier having a series of pivotally mounted package holders thereon, means for guiding the carrier to move the package holders and packages carried thereby through the material in said tank and in an upwardly inclined path over said drip pan, and guiding devices cooperating with said package holders arranged to effect the tilting thereof as the packages are withdrawn from the moisture proofing material and moved over said drip pan.

5. In an apparatus for moisture proofing elongated rectangular filled packages, the combination with a tank for moisture proofing material, of means for passing the material and withdrawing the same therefrom comprising an endless flexible carrier having pairs of grippers arranged to engage and support the packages and substantially in horizontal positions, guiding devices for the carrier and grippers arranged to slightly tilt the packages after withdrawal from the material and effect the draining thereof with one corner of each rectangular package lowermost.

6. An apparatus for moisture proofing filled packages, comprising a tank for moisture proofing material, an endless flexible carrier having pairs of spring actuated gripper arms projecting laterally therefrom arranged to engage and support the packages, driving and guiding devices cooperating with said carrier and grippers arranged to direct the carrier downwardly over the material in the tank and thence upwardly to move the grippers and packages through the material and effect the withdrawal and draining of the packages with the corner of each package lowermost.

7. An apparatus for moisture proofing packages comprising a tank for moisture proofing material, an endless carrier chain, tilting supports on said chain, pairs of laterally projecting grippers on said tilting supports and arranged to engage the opposite ends of the packages, means for guiding the carrier chain downwardly over the material in the tank and thence upwardly at an incline to move the grippers and packages carried thereby through the material and withdraw the same therefrom, and means for tilting the gripper supports on the upwardly inclined portion of the carrier.

8. An apparatus for moisture proofing filled packages, comprising a tank for moisture proofing material, an endless carrier chain, a series of transverse tilting supports on said chain, pairs of laterally projecting, spring actuated grippers on said support, said grippers being arranged to engage the opposite ends of the packages and support the same, guiding devices for said carrier chain arranged to direct the same downwardly over the material in the tank and thence upwardly at an incline, guides arranged to engage said tilting supports and hold said grippers in position, said guides being arranged to tilt the supports upon the upwardly inclined portion of the carrier chain, and means at a portion of the path of movement of said grippers for opening the same to deliver and receive the packages.

9. An apparatus for moisture proofing rectangular filled packages comprising a tank for moisture proofing material, an endless carrier chain having a series of pairs of spring actuated grippers projecting outwardly from the path of movement of the chain and arranged to engage and support the package in a different path of movement, means at one end of the carrier chain for opening the grippers to discharge and receive packages, and means for guiding the lower reach of the carrier downwardly at an incline, thence laterally above the material, and thence upwardly at an incline to an elevated position to thereby move the grippers and the packages through the material and drain the packages.

10. An apparatus for moisture proofing packages, comprising a tank for moisture proofing material, an endless flexible carrier having a series of outwardly projecting pairs of spring actuated grippers for engaging and supporting the packages, means at one end of the carrier for opening the grippers to discharge and receive packages, guiding means for the carrier arranged to direct the lower reach thereof downwardly over the material in the tank and thence upwardly at an incline to move the packages through the material and drain the same, and means for cooling the packages on the upper reach of the carrier.

11. An apparatus for moisture proofing packages, comprising a tank, an endless carrier chain having pairs of outwardly projecting, spring actuated package grippers thereon, driving and guiding sprocket wheels for said chain including wheels at opposite end portions thereof and intermediate wheels for guiding the lower reach of the chain downwardly and thence upwardly to pass the packages through the material in said tank and drain the same, a flue casing inclosing the upper reach of the carrier chain, and a fan for forcing air therethrough.

12. An apparatus for moisture proofing packages, comprising a tank, a carrier having outwardly projecting pairs of package engaging grippers thereon, means for intermittently advancing said carrier to move the packages through the material in said tank, means at one portion of the path of movement of said grippers for shifting the same relatively to said carrier to thereby open the grippers for discharging and receiving packages, and means for feeding packages to the opened grippers.

13. An apparatus for moisture proofing packages, comprising a tank, a carrier having outwardly projecting pairs of package engaging grippers thereon, means for intermittently advancing said carrier to move the packages through the material in said tank, spreader means arranged adjacent the path of movement of said pairs of grippers for opening the same to discharge and receive packages, a feeder for delivering packages to the opened pairs of grippers, and mechanism operative during the periods of rest of said carrier for intermittently actuating said spreader means and said feeder.

14. An apparatus for moisture proofing material comprising a tank, a carrier having pairs of outwardly projecting grippers arranged to engage and support the packages, means for intermittently advancing the carrier to move the packages through the material arranged to arrest the carrier with two of said grippers in discharging and receiving positions respectively, means for opening the grippers in discharging and receiving positions, and means for feeding the packages to the grippers in receiving position.

15. An apparatus for moisture proofing packages, comprising a tank, a carrier having outwardly projecting pairs of spring actuated, package engaging grippers, means for intermittently advancing the carrier to move the packages through the material in said tank, said actuating means being arranged to arrest the carrier with two of said pairs of grippers in discharging and receiving positions respectively, spreading devices for opening the grippers in discharging and receiving positions, and a reciprocating feeder for delivering the packages to the grippers in receiving position.

16. An apparatus for moisture proofing packages, comprising a tank, a carrier having pairs of package engaging grippers thereon, package feeding and delivering carriers located at one end of the apparatus, driving means for intermittently advancing said carrier to move the packages through the material in said tank, said driving means being arranged to arrest the carrier with two of said pairs of grippers in receiving and discharging positions respectively adjacent and above the ends of said package feeding and delivering carriers, spreader means for opening the pairs of grippers in receiving and discharging positions, and a reciprocating feeder for receiving the packages from said feeding carrier and delivering the same to the grippers in receiving position.

17. An apparatus for moisture proofing packages, comprising a tank, a carrier having package holders thereon, mean for advancing said carrier to move the packages through the material in said tank, a reciprocating feeder for delivering the packages to said holders, a package feed chute, a feed belt for pushing the packages through said chute onto said feeder, and operating connections for said feeder having yieldingly connected parts.

18. In an apparatus for moisture proofing filled packages, a tank and a carrier having package holders thereon for moving the packages through the material in said tank, each of said holders comprising a pair of spring actuated plates between which a package is gripped, said plates being free to oscillate to a limited extent in different directions whereby said plates will bear squarely upon opposite faces of the package.

19. In an apparatus for moisture proofing filled packages, a tank and a carrier having package holders thereon for moving the packages through the material in said tank, each of said holders comprising a support, a pair of arms mounted on the ends of said support, and a pair of gripper plates mounted on the ends of said spring arms, said arms and plates being free to oscillate to a limited extent about axes extending respectively longitudinally and transversely of said arms whereby said plates are adapted to bear squarely upon opposite faces of the packages.

20. In an apparatus for moisture proofing filled packages, a tank and a carrier having package holders thereon for moving the packages through the material in said tank, each of said holders comprising a pair of spring actuated arms and gripper plates mounted on said arms, the package engaging faces of said plates being provided with projecting bosses having perforations extending therethrough and sharpened or beveled edges about the inner ends of the perforations.

21. In an apparatus for moisture proofing filled packages, a tank and a carrier having package holders thereon for moving the packages through the material in said tank, each of said holders comprising a transverse support, a pair of U-shaped spring arms having the inner ends thereof extending loosely through openings in said support, and a pair of gripper plates having transverse pivotal connections for the upper ends of said arms, the latter having means for limiting the extent of oscillation of said plates.

22. In an apparatus for moisture proofing rectangular filled packages, the combination with a tank for moisture proofing material, of means for passing the packages through the material comprising an endless flexible carrier having package holders projecting therefrom, and means for guiding the carrier and package holders arranged to maintain the carrier above the material and direct the packages after withdrawal from the material through a substantially straight path below the path of movement of the carrier and with one corner of each rectangular package lowermost to thereby drain the same.

23. In an apparatus for moisture proofing rectangular filled packages, the combination with a tank for moisture proofing material, of means for passing the packages through the material comprising an endless flexible carrier having laterally projecting package holders thereon, and guiding devices for the carrier and package holders arranged to maintain the carrier above the material and direct the packages as they are withdrawn from the material through a substantially straight upwardly inclined path below the path of movement of the carrier and with one corner of each rectangular package lowermost to thereby drain the same.

24. An apparatus for moisture proofing rectangular filled packages comprising a tank for material, an endless flexible carrier having pairs of grippers projecting outwardly from the path of movement thereof and arranged to engage and support the packages in a different path of movement, and driving and guiding devices co-operating with said carrier and grippers arranged to direct the carrier above the material to thereby move the grippers and packages through the material and withdraw the same therefrom and, after withdrawal, direct the packages through a substantially straight path with one corner of each rectangular package lowermost to thereby drain the same.

25. In an apparatus for moisture proofing filled packages, a tank, a carrier having package holders for moving the packages through the material in said tank, each of said holders comprising a pair of plates between which the packages grip, said plates being free to oscillate to a limited extent in different directions, whereby they will bear squarely upon opposite faces of the package.

26. In an apparatus for moisture proofing filled packages, a tank and a carrier having package holders thereon for moving the packages through the material in said tank, each of said holders comprising a pair of plates spring-pressed toward each other between which the packages are gripped, said plates being movably mounted to bear squarely upon opposite faces of a package and the package engaging faces of said plates being provided with projecting bosses.

27. In an apparatus for moisture proofing rectangular filled packages, the combination with a tank for moisture proofing material, of means for passing the packages through the material comprising an endless carrier having package holders thereon and guiding devices for said carrier and said holders arranged to maintain the carrier above the material and effect the draining of the packages while suspended below the carrier and with one corner of each package lowermost.

28. In an apparatus for moisture proofing elongated, rectangular filled packages, the combination with a tank for moisture proofing material, of means for passing the packages through the material and withdrawing the same therefrom, comprising an endless flexible carrier having laterally projecting holders arranged to support the elongated rectangular packages in substantially horizontal positions, guiding devices for the carrier and holders arranged to maintain the carrier above the material and slightly tilt the packages after withdrawal from the material and effect the draining of the same with each package suspended below the carrier and with one corner thereof lowermost.

LOUIS MORINSKY.